J. A. DODGE.
Harvester Rake.
No. 67,851. Patented Aug. 20, 1867.
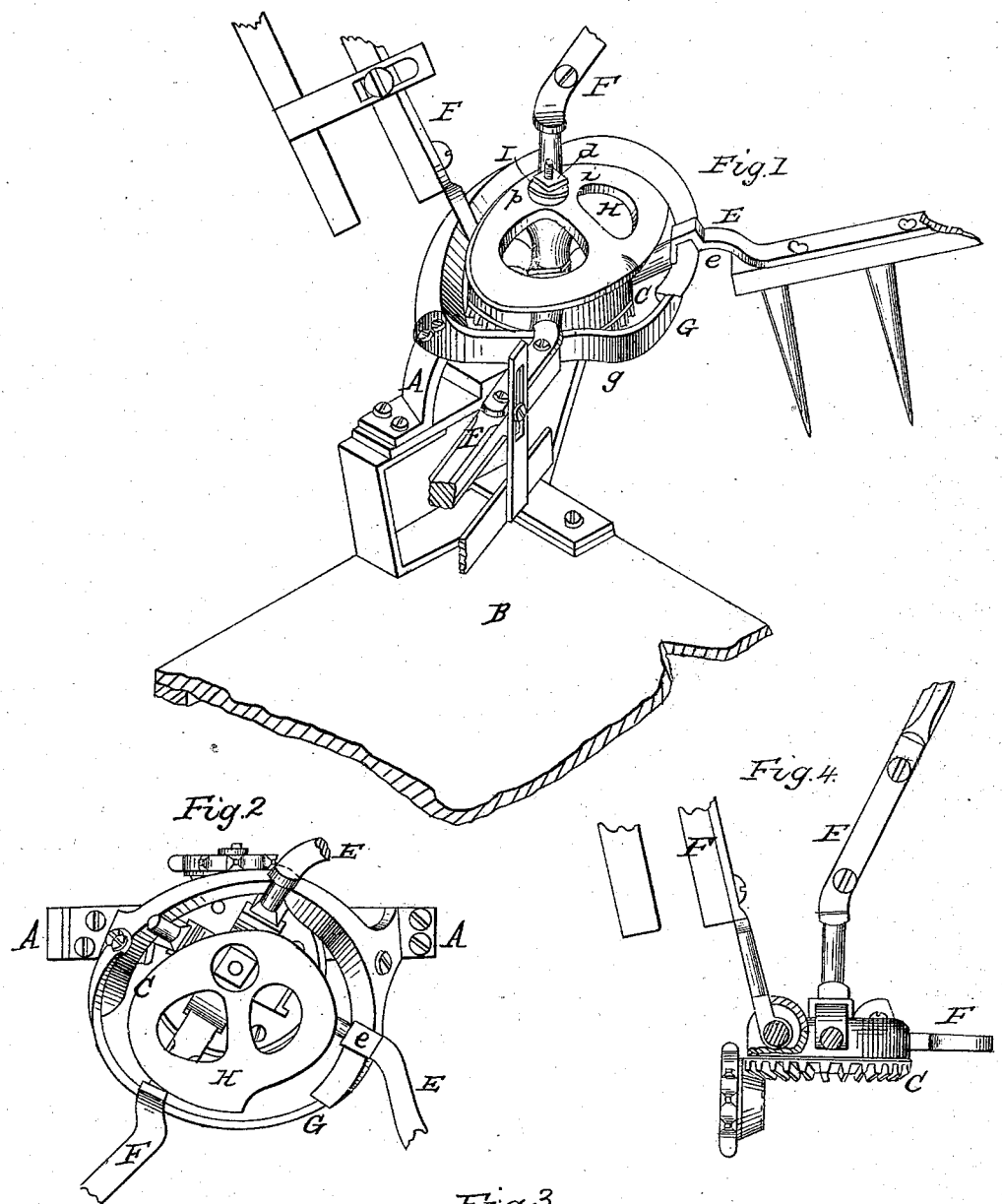
Witnesses
J. S. Peyton
Theodore Lang
Inventor
John A. Dodge
by his Atty.
Baldwin & Son

UNITED STATES PATENT OFFICE.

JOHN A. DODGE, OF AUBURN, NEW YORK.

IMPROVEMENT IN HARVESTER-RAKES.

Specification forming part of Letters Patent No. 67,851, dated August 20, 1867.

*To all whom it may concern:*

Be it known that I, JOHN A. DODGE, of Auburn, in the county of Cayuga and State of New York, have invented certain new and useful Improvements in Harvester-Rakes, of which the following is a full, clear, and exact description, reference being had to the accompanying drawings, which make part of this specification, and in which—

Figure 1 represents a view, in perspective, of so much of a harvester-rake embracing my improvements as is necessary to illustrate my invention. Fig. 2 is a plan or top view of the same. Fig. 3 is a vertical central section through the cam-plate and locking-washer; and Fig. 4 is a view, partly in section, of the gearing and rake-arms.

My invention relates to that class of rakes having a series of independent reel and rake arms rotating about a common center and guided by a cam; and the improvements herein claimed consist, first, in combining a cam-plate with a stationary post around which the rake revolves, and a locking washer and nut to hold the plate firmly in position; second, in combining, with the cam ring or guide which controls the movements of the rake and reel arms, a cam-plate to hold the rake down when raking off.

My improvements are to be applied to a fully-organized harvester; but in the accompanying drawings I have only shown those parts necessary to illustrate my invention, as the construction of the machine itself may be varied in many ways.

In this instance the rake is mounted in a suitable frame, A, secured upon the heel of the finger-beam or inner front corner of the platform B. A crown-wheel, C, driven in any well-known and suitable way, revolves on a fixed spindle, D. A series of rake and reel arms, E F, is pivoted to play vertically in suitable boxes in the crown-wheel C, their rising and falling movements being controlled by a cam-guide, G. To hold the rake properly down upon the platform I employ a peculiarly-shaped cam-plate, H, which is supported upon the spindle D. The cam-guide, it will be noticed, is curved upward slightly at $g$, in order to lift the beaters after they have swept the grain back upon the platform, in order that they may not scatter it. The rake-arm E has a square recess, $e$, formed in it, in order that it may pass over the rise in the cam without lifting, in order to keep its teeth down upon the platform when raking off. The cam-plate serves not only to keep the arms in position as they rotate, but also holds the rake down with a positive motion when raking off. To retain the cam-plate properly in position I form a slight flange, $h$, on its upper side, and cut a notch on the inner side of the flange. I then flatten the inner side of the spindle D and slip a locking-washer, I, over the spindle, the washer having a projection, $i$, on its inner and under side corresponding to the notch in the flange of the cam-plate. A nut, $d$, is then screwed down upon the washer, and the cam-plate is firmly locked in position.

What I claim as my invention, and desire to secure by Letters Patent, is—

1. The combination, substantially as described, of a cam-plate and locking-washer with a fixed spindle, for the purpose set forth.

2. The combination, substantially in the manner described, of a series of rising and falling rake and reel arms revolving around a fixed spindle or axis, with a cam-guide to control their vertical movements, a cam-plate to hold the rake down when raking off, and a locking-washer to hold the cam-plate firmly in position.

In testimony whereof I have hereunto subscribed my name.

JOHN A. DODGE.

Witnesses:
HORACE T. COOK,
A. C. MUNGER.